United States Patent [19]
Amano

[11] Patent Number: 5,376,970
[45] Date of Patent: Dec. 27, 1994

[54] DISPLAY SYSTEM FOR VIDEO APPARATUS

[75] Inventor: Toshio Amano, Kanagawa, Japan

[73] Assignee: Sony Corporation, Tokyo, Japan

[21] Appl. No.: 18,208

[22] Filed: Feb. 16, 1993

[30] Foreign Application Priority Data

Feb. 17, 1992 [JP] Japan .................................. 4-061072

[51] Int. Cl.⁵ .............................................. H04N 5/50
[52] U.S. Cl. .................................... 348/569; 348/581;
    348/734; 345/128; 345/169
[58] Field of Search ................... 358/192.1, 188, 194.1,
    358/22; Ho4N 5/50; 340/706, 731; 348/734,
    725, 569, 570, 581; 345/169, 129, 128, 130

[56] References Cited

U.S. PATENT DOCUMENTS

| | | | |
|---|---|---|---|
| 4,366,502 | 12/1982 | Shiu | 358/192.1 |
| 4,405,946 | 9/1983 | Knight | 358/192.1 |
| 4,430,671 | 2/1984 | Tamer | 358/192.1 |
| 4,754,270 | 6/1988 | Murauchi | 340/731 |
| 5,138,450 | 8/1992 | Fukuda et al. | 358/183 |
| 5,194,953 | 3/1993 | Chan et al. | 358/192.1 |

Primary Examiner—James J. Groody
Assistant Examiner—Jeffrey Murrell
Attorney, Agent, or Firm—Jay H. Maioli

[57] ABSTRACT

A display system for a video apparatus in which, when a video signal processing device such as a tuner manipulable both remotely and directly is manipulated, a pattern representing the state of a controlled function of the apparatus is displayed on a screen of a picture receiving device such as a monitor, wherein the form of the displayed pattern is changed in conformity with remote or direct control manipulation. The size of the displayed pattern and the position thereof are changeable to be in response to either remote or direct control manipulation so that a television viewer can see the pattern with ease. The display system is applicable to any video apparatus such as a television receiver, a video tape recorder, or a television receiver equipped with a video tape recorder.

5 Claims, 6 Drawing Sheets

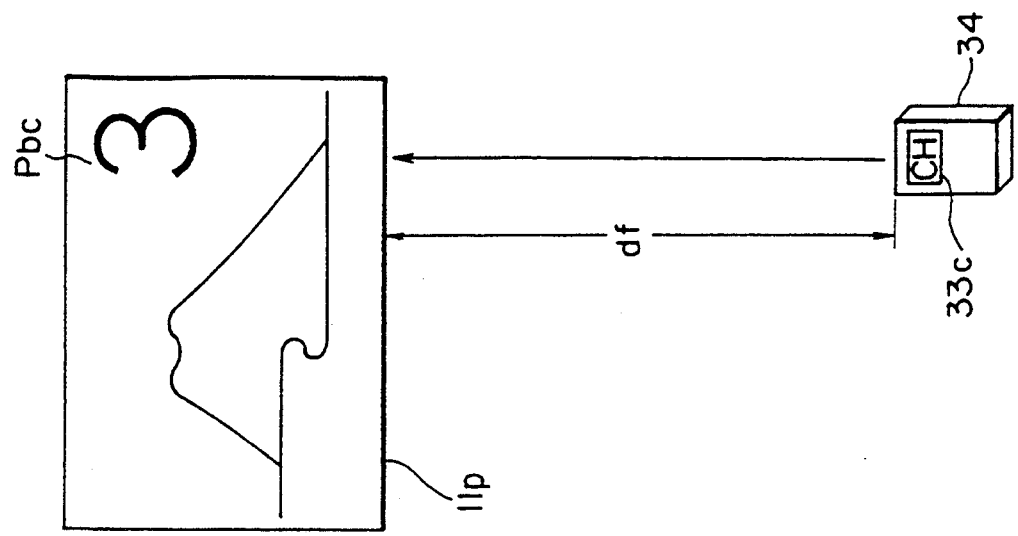
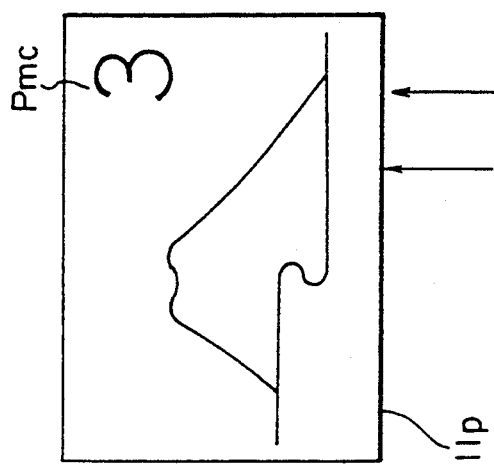
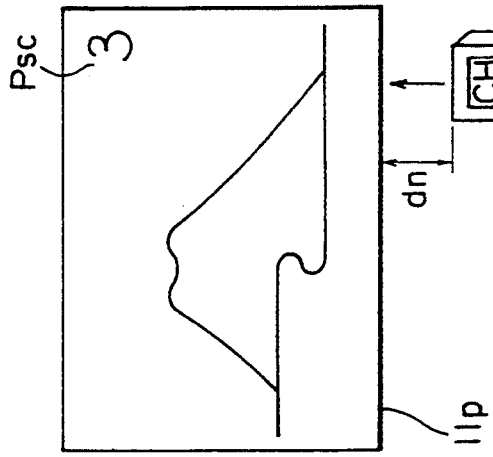

DISPLAY SYSTEM FOR VIDEO APPARATUS

BACKGROUND OF THE INVENTION

1. Field of the Invention

The present invention relates to a system for displaying the functions of a video apparatus such as a television receiver.

2. Description of the Prior Art

There has been known heretofore that, in a television receiver with a relatively large screen, a remote control unit utilizing infrared rays or the like is employed to execute channel selection or sound volume control from a position distant from the television receiver. And when such a remote control unit is manipulated, information that represents the operation state inclusive of the selected channel, the sound volume and so forth is displayed on the screen with characters or a pattern so that a television viewer can confirm the result of his manipulation.

The basic functions of the television receiver such as channel selection and sound volume control are changeable also by directly manipulating the keys provided on the television receiver itself. And in the case of such direct control, similarly to the above, a pattern representing the operation state and so forth is visually displayed on the screen of the television receiver in the same size as that by the remote control.

Generally the size of such display pattern is set to relatively large dimensions so that the television viewer can see it easily from a distant position at the time of remote control. Consequently, during the direct control, the pattern size is larger than actually required and is therefore difficult to see and impedimental to the picture being received.

Relative to video tape recorders also, an operation mode such as playback, fast forward or rewind is displayed on the screen of a receiver for both remote control and direct control and consequently raise the same problem as the above.

OBJECT AND SUMMARY OF THE INVENTION

It is an object of the present invention to provide an improved system for displaying the functions of a video apparatus in such a manner that any function of a video signal processing device such as a tuner displayed on the screen of a picture receiving device such as a monitor can be easily seen regardless of whether the control manipulation is executed remotely or directly.

According to one aspect of the present invention, there is provided a display system for a video apparatus in which, when a video signal processing device such as a tuner manipulable both remotely and directly is manipulated, a pattern representing the state of a controlled function of the apparatus is displayed on a screen of a picture receiving device such as a monitor, wherein the form of the displayed pattern is changed in conformity with remote or direct control manipulation.

According to another aspect of the present invention, there is provided a display system for a video apparatus wherein the size of a displayed pattern is changed to be large at the time of remote control manipulation or to be small at the time of direct control manipulation. The display system is applicable to a television receiver, a video tape recorder, or a television receiver equipped with a video tape recorder.

According to a further aspect of the present invention, there is provided a display system for a television receiver wherein the position of a displayed pattern is changed in conformity with remote or direct control manipulation.

Due to such a constitution, any controlled function of the video signal processing device such as a tuner can be displayed with a conveniently sized and positioned pattern on the screen of the picture receiving device such as a monitor.

The above and other features and advantages of the present invention will become apparent from the following description which will be given with reference to the illustrative accompanying drawings.

BRIEF DESCRIPTION OF THE DRAWINGS

FIGS. 6A to 6C are schematic diagrams for explaining the operation of a fourth embodiment of the invention.

DESCRIPTION OF THE PREFERRED EMBODIMENTS

Hereinafter a description will be given of a first embodiment representing an exemplary case where the display system of the present invention is applied to a separate type television receiver.

Figure 2:
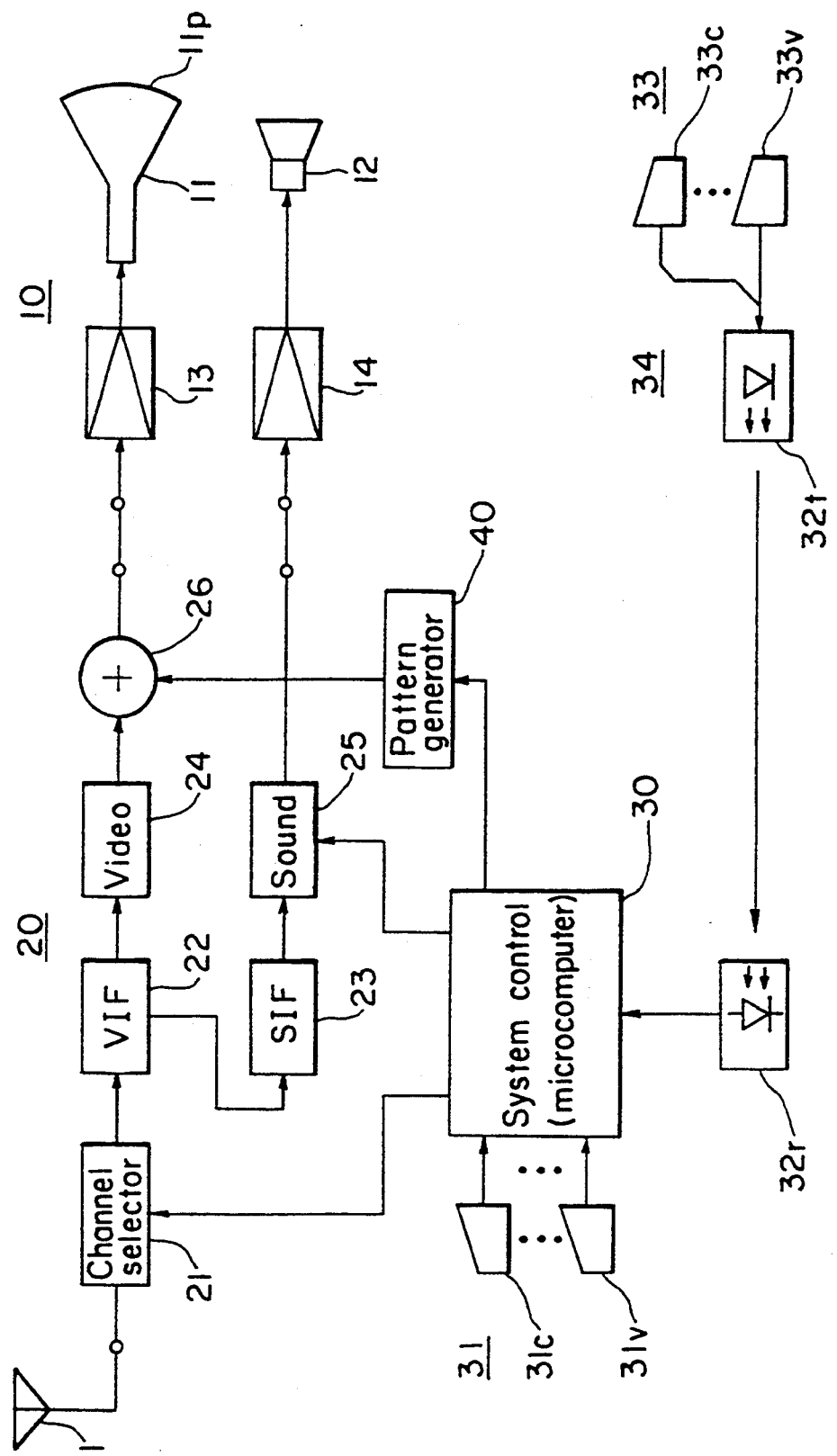
FIG. 2 is a system diagram showing the the first embodiment of the invention.

In FIG. 2, a monitor 10 comprises a picture tube 11, a speaker 12, and respective driving amplifiers 13, 14 thereof. The picture tube 11 employed here has a relatively large screen 11p.

Denoted by 20 is a tuner which consists principally of a channel selector circuit 21, a video intermediate frequency circuit 22, a sound intermediate frequency circuit 23, a video signal circuit 24, and a sound signal circuit 25. A television broadcast signal received at an antenna 1 is supplied therefrom to the channel selector circuit 21, and the output of the video signal circuit 24 is supplied via an adding circuit 26 to the driving amplifier circuit 13, while the output of the sound signal circuit 25 is supplied to the driving amplifier circuit 14.

Denoted by 30 is a system control microcomputer, to which there are connected direct control keys 31 disposed on the front panel of the tuner 20, and also a photodiode 32r for receiving infrared rays emitted from a remote control unit 34.

The output of the microcomputer 30 is supplied to both the channel selector circuit 21 and the sound signal circuit 25 while being supplied also to a pattern generator circuit 40, whose output is then supplied to the adding circuit 26 so as to be superposed on the video signal.

The remote control unit 34 comprises remote control keys 33 and a light emitting diode 32t which transmits a key output in the form of infrared rays. Such light emitting diode 32t and the aforementioned photodiode 32r constitute an infrared transmission line.

Figure 1:
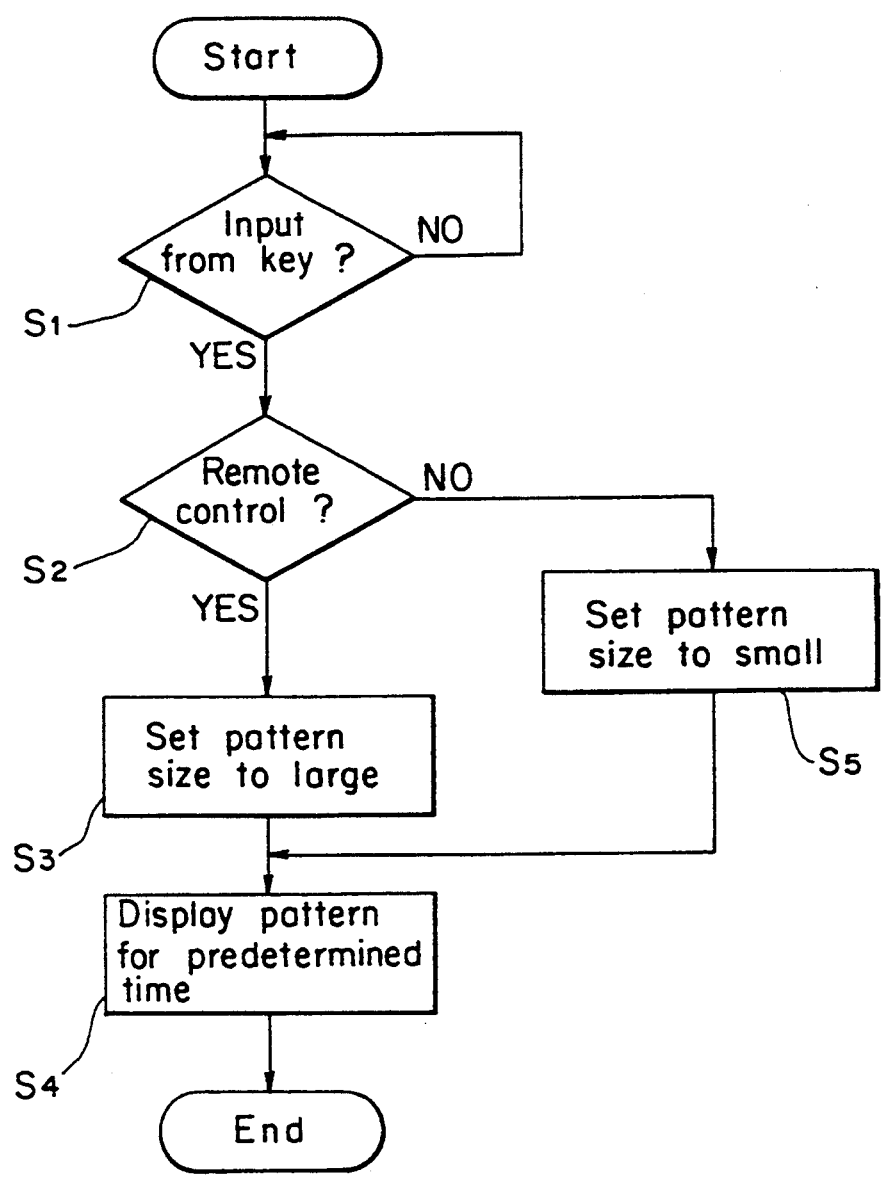
FIG. 1 is a flow chart of the processing routine executed in a first embodiment of the present invention.
Figure 3A:
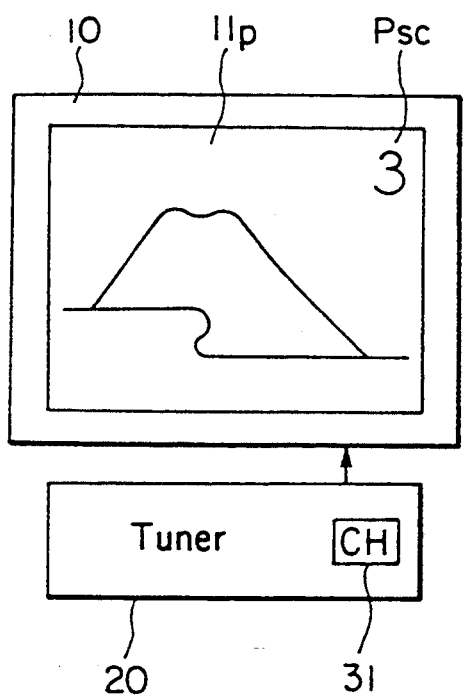
FIGS. 3A and 3B are schematic diagrams for explaining the operation of the first embodiment.
Figure 3B:
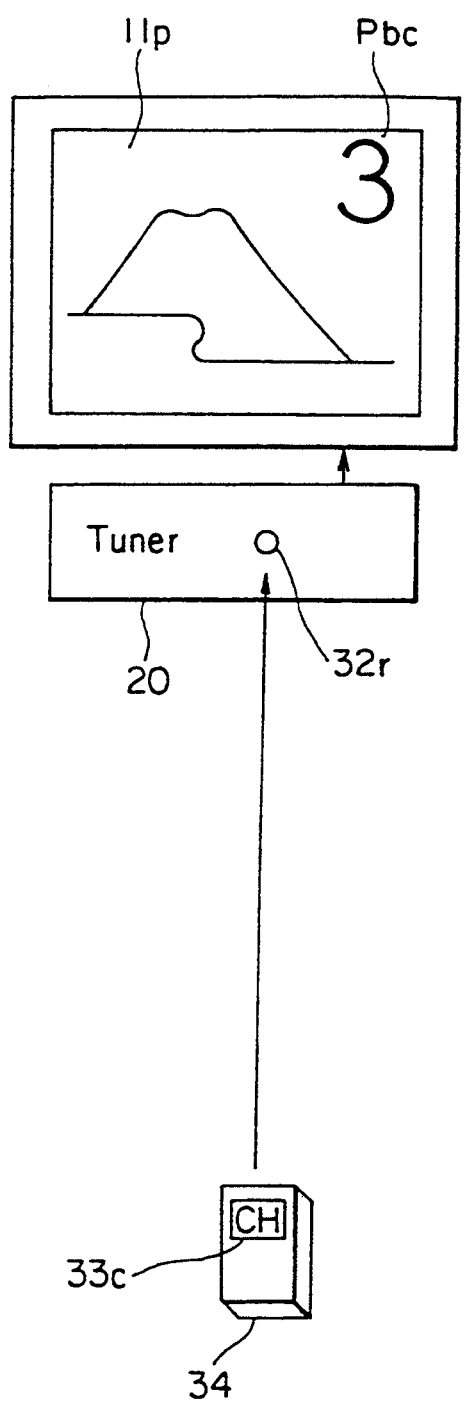

Referring now to FIGS. 1 and 3, the operation for channel selection and display in the first embodiment of the present invention will be described below.

As shown in FIG. 1, the microcomputer 30 is initially in a standby mode at step S1 to wait for an input from the key 31 or 33. In response to any input from the key 31 or 33, a decision is made at step S2 as to whether the key input is derived from depression of the direct channel select key 31c or from depression of the remote channel select key 33c.

In case the result of such decision signifies depression of the direct channel select key 31c out of the entire direct control keys 31, the pattern (channel number) in the pattern generator circuit 40 is set to a relatively small size at step S5 and, as illustrated in FIG. 3A for example, a small-sized channel number Psc is displayed at step S4 for a predetermined time of, e.g., 5 seconds in an upper right portion of the screen 11p.

Figure 5A:
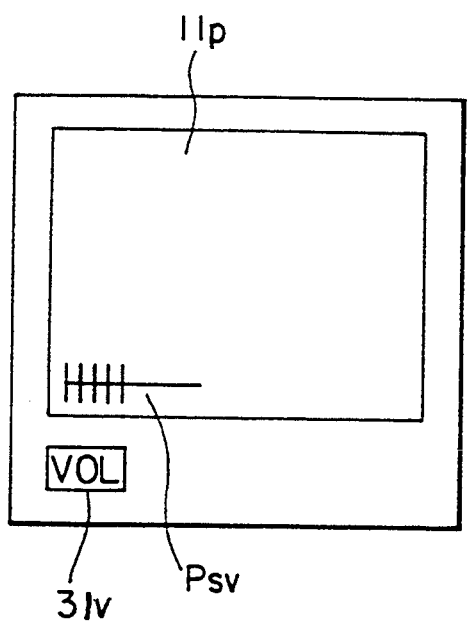
FIGS. 5A and 5B are schematic diagrams for explaining the operation of a third embodiment of the invention.
Figure 5B:
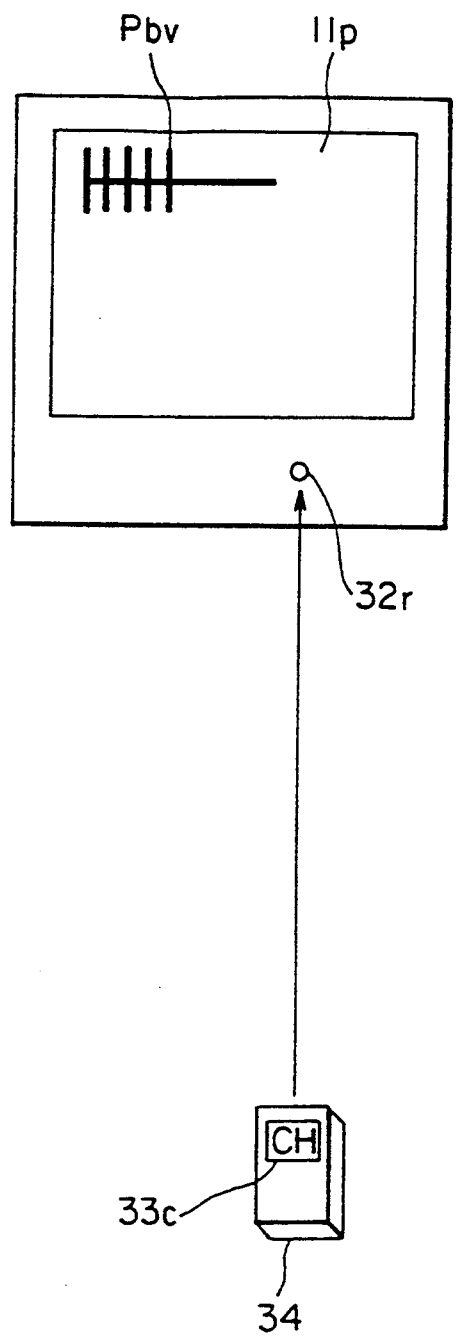

If the result of the decision at step S2 signifies depression of the remote channel select key 33c out of the entire remote control keys 33, then the pattern in the pattern generator circuit 40 is set to a relatively large size at step S5 as in the conventional system and, as illustrated in FIG. 5B for example, a large-sized channel number Pbc is displayed at step S4 for a predetermined time of, e.g., 5 seconds in an upper right portion of the screen 11p.

Thus, according to the present invention, a relatively large channel number is displayed at the time of remote channel selection, whereas a relatively small channel number is displayed at the time of direct channel selection. In this manner, the channel number is displayed in an adequate size conforming with the individual requirement and can be easily recognized on the screen by a television viewer. Since the size of the displayed channel number is different depending on the depression of the key 31 or that of the key 33, there seldom occurs any error in selecting the appropriate display size.

The first embodiment mentioned above represents an exemplary case of applying the present invention to a television receiver. However, it is to be understood that the present invention is applicable, in an exactly similar manner, also to a tuner incorporated in a video tape recorder.

For displaying the controlled function of a video tape recorder itself, the present invention is applicable similarly to the foregoing case by replacing the tuner 20, which is included in FIG. 2, with a video tape recorder.

In addition to the aforementioned embodiment representing an exemplary case of applying the invention to a separate television receiver, it is possible to apply the invention to an integral television receiver as well in the following manner.

Figure 4A:
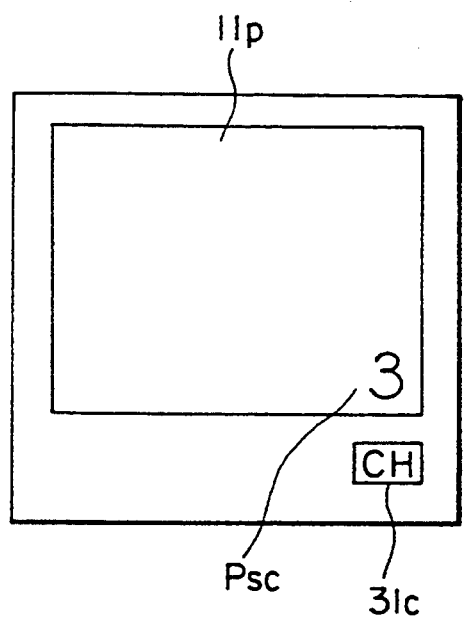
FIGS. 4A and 4B are schematic diagrams for explaining the operation of a second embodiment of the invention.

In an integral television receiver, as illustrated in FIGS. 4A and 5A, direct control keys 31c and 31v for channel selection and sound volume control are disposed usually on the front panel of the receiver under the screen 11p of the picture tube. Upon direct control manipulation in such a receiver, a small-sized channel number Psc or a thin-line volume pattern Psv is displayed in a lower portion of the screen 11p as illustrated so that the display position is proximate to the corresponding control key 31c or 31v and is seen with ease.

Figure 4B:
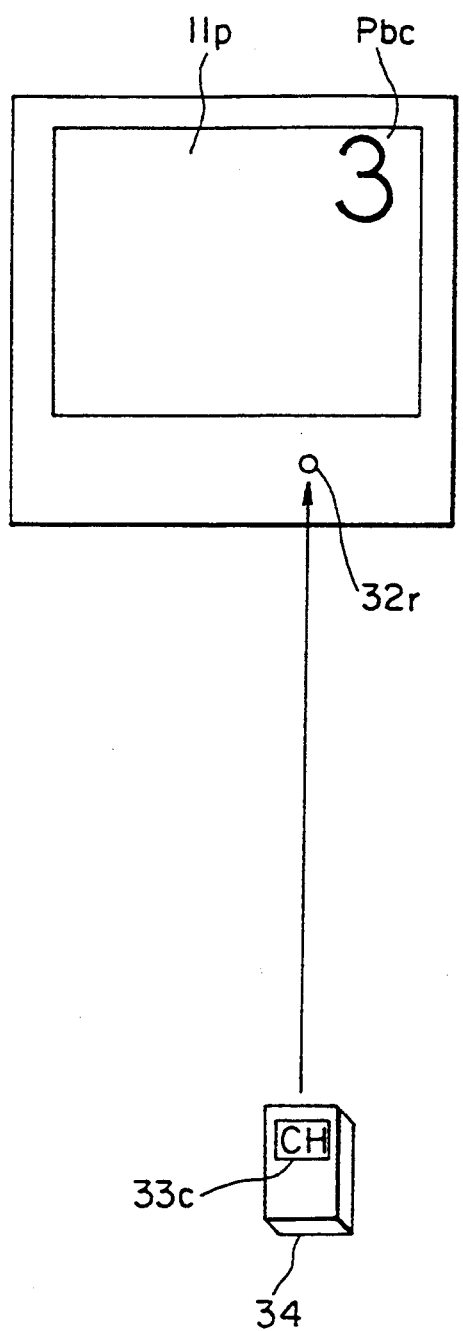

And upon remote control manipulation in such an integral television receiver, a large-sized channel number Pbc or a thick-line volume pattern Pbv is displayed in an upper portion of the screen 11p as illustrated in FIGS. 4B and 5B so as to be easily seen by a viewer at a position distant from the television receiver.

Further at the time of remote control manipulation, the size of a displayed pattern can be changed, by means of a telemeter circuit incorporated in a television receiver or the like, in accordance with the viewer's position dn, dm or df as illustrated in FIGS. 6A to 6C.

According to the present invention, as described hereinabove, a satisfactory display system can be realized for a video apparatus wherein the form or size of a displayed pattern is changed in conformity with remote or direct control manipulation so that the controlled function of a video signal processing device such as a tuner is displayed adequately to be seen with ease. In addition, there is further achievable another advantageous effect that any error in selecting an appropriate display size preventable since the size of a displayed channel number is different depending on the manipulation the key 31 or that of the key 33.

What is claimed is:

1. A display system for a video apparatus in which the remote selection by a remote controller or direct selection by keys on the apparatus of a function of a video signal processing device causes a pattern representing the state of a selected function to be displayed on a screen of a picture receiving device, comprising:

means for displaying the pattern representing the selected function; and means for changing the size of the displayed pattern in response to operation either by the remote controller or the keys on the apparatus, whereby the size of the displayed pattern is large when the remote controller is operated, and the size of the displayed pattern is small when the keys on the apparatus are operated.

2. The display system according to claim 1, wherein said video apparatus is a television receiver.

3. The display system according to claim 1, wherein said video apparatus is a video tape recorder.

4. The display system according to claim 1, wherein said video apparatus is a television receiver equipped with a video tape recorder.

5. The display system for a video apparatus according to claim 1, further comprising means for changing the position of the displayed pattern in response to operation either by remote or direct control.

* * * * *